United States Patent [19]

McDaniel

[11] Patent Number: 5,366,763
[45] Date of Patent: Nov. 22, 1994

[54] METHODS OF PRODUCING DURABLE LUSTROUS COATING ON VITREOUS OBJECTS

[76] Inventor: Harry C. McDaniel, 2101 Grandin Rd., Apt. 405, Cincinnati, Ohio 45208

[21] Appl. No.: 68,775

[22] Filed: Jun. 1, 1993

Related U.S. Application Data

[63] Continuation-in-part of Ser. No. 894,826, Jun. 8, 1992, abandoned.

[51] Int. Cl.$^5$ ............................................. B05D 3/02
[52] U.S. Cl. .................... 427/193; 427/204; 427/376.2; 427/376.4; 427/419.4
[58] Field of Search ............ 427/193, 204, 205, 376.2, 427/376.4, 376.5, 419.2, 419.3, 419.4, 419.6, 397.7; 428/324, 363; 106/DIG. 3

[56] References Cited

U.S. PATENT DOCUMENTS

| | | | |
|---|---|---|---|
| 1,872,234 | 8/1932 | Boughton | 106/417 |
| 2,663,658 | 12/1953 | Schurecht | 427/376.2 |
| 2,701,774 | 2/1955 | Marsell et al. | 427/204 |
| 2,774,681 | 12/1956 | Huppert et al. | 427/204 |
| 2,920,971 | 1/1960 | Stookey | 106/39 |
| 3,087,828 | 4/1963 | Linton | 106/291 |
| 3,087,829 | 4/1963 | Linton | 106/291 |
| 3,206,355 | 9/1965 | Pfaender | 427/376.2 |
| 3,331,699 | 7/1967 | Marshall | 106/415 |
| 3,338,732 | 8/1967 | Holcomb | 427/376.4 |
| 4,353,991 | 10/1982 | Van Ness et al. | 501/20 |
| 4,361,622 | 11/1982 | Theisen et al. | 428/363 |
| 4,459,328 | 7/1984 | Mizuhara | 427/192 |
| 4,501,778 | 2/1985 | Menschner et al. | 427/376.2 |
| 4,509,988 | 4/1985 | Bernhard | 428/404 |
| 4,720,438 | 1/1988 | Watanabe et al. | 427/376.2 |
| 4,820,555 | 4/1989 | Kuwajima | 427/407 |
| 4,840,850 | 6/1989 | Clark | 428/471 |
| 4,883,525 | 11/1989 | Buckley | 65/37 |
| 5,022,923 | 6/1991 | Rau et al. | 106/415 |
| 5,032,429 | 7/1991 | Diefenbach | 427/376.2 |
| 5,106,419 | 4/1992 | Hechler et al. | 106/418 |

FOREIGN PATENT DOCUMENTS

| | | | |
|---|---|---|---|
| 323349 | 7/1989 | European Pat. Off. | |
| 44-25715 | 10/1969 | Japan | 427/376.4 |
| 49-99114 | 9/1974 | Japan | |
| 55-34658 | 3/1980 | Japan | |
| 60-169574 | 9/1985 | Japan | 427/376.2 |
| 63-176334 | 7/1988 | Japan | |
| 01-33031 | 2/1989 | Japan | 427/419.4 |
| 01-36775 | 2/1989 | Japan | 427/419.4 |
| 01-149975 | 6/1989 | Japan | 427/419.4 |

*Primary Examiner*—Terry J. Owens
*Attorney, Agent, or Firm*—Charles R. Wilson

[57] ABSTRACT

An application method for flux-free, frit-free luster pigments based on inorganic platelet-like particles with at least one metal oxide surface coating comprises initially applying the pigments to a vitreous surface such as a vitreous enamel on a metal substrate, a vitreous glaze on a ceramic substrate, glass, or an overglaze on a glass, enameled metal or glazed ceramic substrate. The vitreous surface is in a fused or unfused state prior to the luster pigment application. The luster pigment is surface applied to the vitreous surface. Next, the surface is heated to a temperature and for a time sufficient to fix the luster pigments to the surface.

37 Claims, No Drawings

METHODS OF PRODUCING DURABLE LUSTROUS COATING ON VITREOUS OBJECTS

This is a continuation-in-part of "Luster Pigment Application Methods", Ser. No. 07/894,826, filed Jun. 8, 1992, now abandoned.

This invention relates to methods of applying inorganic based luster pigments to a surface. More particularly, the invention relates to a method of applying the luster pigments to a vitreous surface in a manner wherein the luster pigment is fixed thereto without causing an adverse appearance effect.

BACKGROUND OF THE INVENTION

Luster pigments have a unique appearance. They have a pearlescent appearance which is pleasing to the eye. Those luster pigments which have been widely commercialized are mica flakes coated with a metal oxide such as titanium dioxide and/or ferric oxide. They are described in U.S. Pat. Nos. 3,087,828 and 3,087,829. The pigments are recommended for use in many formulations and have found wide acceptance in automotive paints, printing inks, plastic bottles, cosmetics and simulated pearls. Other luster pigments which are commercially available, though have not been as widely used, have an inorganic platelet-like particle such as glass with the metal oxide coating. They are described in U.S. Pat. No. 3,331,699. Organic luster pigments, as described in U.S. Pat. No. 5,026,429, are also available.

Use of the luster pigments in vitreous compositions, however, has been limited. Vitreous compositions, per se, are well known. They are based on ground glass, glass forming materials or a mixture of both. Such compositions can be coatings which are applied to a substrate and then heated or fired to a temperature sufficient to cause the coating components to melt. When cooled, a thin coating of glass is formed on the substrate. The coatings are commonly referred to as vitreous enamels when the substrate is a metal and vitreous glazes when the substrate is a ceramic. The coatings are used to decorate the substrate with color or artistic renditions as well as add to the substrate's durability in terms of scratch and mar resistance, moisture barrier, etc.

The customary and normal procedure for incorporating pigments in vitreous compositions is to include them in the body of the composition's glass component. Alternatively, the pigments are incorporated in a vitreous flux which is applied to a vitreous substrate. In either case, the vitreous composition must be heated to a high temperature to fuse the glass components. It follows that any pigment included in the formulation must be able to withstand the high temperatures. This has not been a problem with many of the pigments which are available. Data sheets provided by the pigment suppliers as well as acquired knowledge of the artisan or manufacturer are sufficient. However, understandably there are certain pigments either because of their color or other visual effect which cannot be used in certain vitreous compositions. It has been found that the luster pigments are not stable at the elevated temperatures experienced. It appears that the glass components attack the pigments at the elevated temperatures. The formed surfaces simply do not have the desired appearance.

The instability problem of luster pigments in vitreous compositions, including coatings and substrate bodies is recognized. U.S. Pat. No. 5,022,923 acknowledges the problem and suggests a solution. The described pigments are provided with a top coating of tin dioxide and/or cerium dioxide. Necessarily, the specially treated luster pigments are more expensive. Additionally, while more stable, their stability is less than ideal. Certain applications of the disclosed luster pigments still do not result in the desired appearance. Furthermore, when the luster pigments are incorporated in a vitreous flux, an inordinate amount of luster pigment is required to obtain proper color intensity. Another drawback is the fact that transparent fluxes must be used for the desired color effects.

In accord with a need, there has been developed methods of imparting a desired luster pigment appearance to substrates having a vitreous surface. The application methods are economical and practical. The resultant products produced by the methods have the desired pleasing appearance with no disadvantages.

SUMMARY OF THE INVENTION

Luster pigment is applied to a vitreous surface in a manner whereby the pigment is fixed to the surface without adversely affecting its appearance. The vitreous surface has a vitreous body or the vitreous surface overlies substrates made of dissimilar materials. Plate glass inherently has a vitreous surface. A metal having a vitreous enamel surface, a ceramic having a vitreous glaze surface and glass, enameled metals and glazed ceramics having vitreous overglazes are examples of substrates with vitreous surfaces used in the method. The method comprises applying a surface coating of an inorganic based luster pigment to the vitreous surface and thereafter heating the surface to a temperature and a time sufficient to fix the pigment to the surface.

DETAILED DESCRIPTION OF INVENTION

The invention relates to methods of applying luster pigments to a vitreous surface. The steps in the methods as well as the vitreous surface materials are described in detail in the following paragraphs. It will be appreciated that the described methods are useful to the individual craftsman and hobbyist as well as to industrial plants producing mass quantities of products for consumer use. Thus, the individual craftsman will use the invention in producing small ceramic wares such as vases having a very decorative and pleasing appearance. The industrial plants will utilize the invention in producing consumer items such as bath tubs, pedestal sinks, plate glass, etc. having a pleasing and unique appearance.

Several different substrates having a vitreous surface are used in the method of this invention. The substrates can be metallic or ceramic in nature and include cast iron, steel, aluminum, copper, silver, gold, porcelain and glass. Generally, the substrate is a formed or machined object such as a bath tub, vase, chinaware, window glass or some other structural object. The vitreous surface is a vitreous enamel, vitreous glaze, or vitreous overglaze. Vitreous enamels, glazes and overglazes are well known and commercially available. The text books, "What Every Engineer Should Know About Ceramics", by Solomon Musikant, Marcel-Dekker, 1991 and "Elements of Ceramics", by F. H. Norton, Addison-Wesley, 1970, 2nd Edition, include general formulations as well as specific enamels, glazes and overglazes. All are usable in this invention. In the case of glass, the substrate and the vitreous surface are the same.

The luster pigments used in the method of this invention are inorganic based because of their temperature stability at the temperatures encountered. They have a temperature stability to deformation of at least about 800 degrees Fahrenheit. The pigments are inorganic platelet-like particles with a surface coating of at east one metal oxide layer. The pigments are actually transparent inorganic platelets having a coating of a metal oxide on each of the broad faces of the platelet. The optical contribution is made by the metal oxide layers. Thus, each pigment particle behaves like two metal oxide platelets held together by the particle substrate. The particles typically have a length of from about 1 micron to about 180 microns, a width of from about 1 micron to about 180 microns and a thickness of from about 0.1 microns to about 3 microns. Platelet-like particles include mica and glass. Metal oxides used as the coatings include titanium dioxide, ferric oxide, zinc oxide, zirconium oxide, nickel oxide, cobalt oxide and chromium oxide.

Mica flakes coated with the titanium dioxide, ferric oxide, or a mixture thereof are preferred because of their ready availability. The mica based pigments with a titanium dioxide surface coating are stable to about 1900 degrees Fahrenheit. The mica based pigments with a ferric oxide surface coating are stable to about 2000 degrees Fahrenheit. The later pigments are especially useful on glass in that they fix at a relatively lower temperature and are more intense. The glass based pigments with a titanium dioxide surface coating are stable to about 1500 degrees Fahrenheit and while less stable than the mica based pigments, have more sparkle. Additionally, the glass platelet-like particles of the pigment can be colored with a metal oxide such as the cobalt oxide to enhance the luster effect.

The luster pigments used herein can be stabilized with a top layer of tin dioxide and cerium dioxide as suggested in U.S. Pat. No. 5,022,923. However, the stabilization is not necessary and is less preferred in the method described herein because of an added cost without an appreciably noticeable benefit.

Initially, the luster pigments are applied to the vitreous surface in an effective amount to give the desired appearance. The amount of pigment applied is not critical. Typically, about one gram of pigment per square foot of vitreous surface is sufficient to give a satisfactory lustrous appearance for most products. If excess luster pigment on the finished product after firing is to be avoided, the pigment is applied in a controlled amount, e.g. by screen printing to suit a particular vitreous surface, luster intensity, and temperature/time firing process. The thinner coats have excellent luster quality at the reflective angle and good transparency at the transmission angles with good gloss. The thicker coats give a matt appearance. Excessive pigment application is tolerated in that any excess which is not fixed to the vitreous surface as further discussed below is simply washed away to leave a surface with the desired pleasing appearance. In the method herein, the pigments are applied as a powder by dusting or electrostatic spraying onto the vitreous surface, or they are applied as a liquid by first dispersing in a liquid carrier such as water or an organic solvent. The pigment dispersed in a liquid is sprayed, brushed or rolled directly onto the vitreous surface. In the case of application to a vitreous overglaze, the pigment can be dusted or brush-applied onto the overglaze. Alternatively, and more preferably, the overglaze is in the form of a decorative screen print or decal composed of an unfused first layer of frit and a luster pigment layer which is applied to a substrate such that the luster pigment layer is on the surface.

The vitreous surface itself on which the luster pigments are applied is a fused solid, unfused solid, or in certain instances as described below is still in the form of a dry or wet unfused vitreous enamel, glaze or overglaze. The mesh size of the unfused enamel or glaze is about 200 to about 325 to assure an even coat of luster pigment, while the particle sizes for the pigment are about 5 microns to about 25 microns for a satin finish, about 10 microns to about 60 microns for a brilliant finish, and about 10 microns to about 150 microns for sparkle/glitter finishes. The same pigment particle size is used for a fused vitreous surface to get the same degree of finish. Most importantly, the luster pigments are applied as a surface coating and are applied without benefit of a flux, frit or other binder material.

The substrate with its vitreous surface and surface applied luster pigment is heated to fix the pigment to the vitreous surface. For the wet vitreous coatings, the substrate is first heated to dry the coating by driving off the liquid carrier prior to the heating step to fix the pigments. In either case, the vitreous surface is heated to a temperature and time sufficient to fix the luster pigment to the surface. The temperature needed is dependent on the vitreous surface. For a vitreous enamel, vitreous glaze, or a vitreous overglaze surface, the temperature is at least about 180 degrees Fahrenheit, preferably about 260 degrees Fahrenheit to about 380 degrees Fahrenheit above the softening point of the vitreous surface. For a glass surface, the temperature is at least about 200 degrees Fahrenheit, preferably about 200 degrees Fahrenheit to about 300 degrees Fahrenheit below the softening point of the glass. Generally, an at least about three minutes time span is needed at the elevated temperatures to fix the pigments to the vitreous surface. In general, the greater the fixing temperature difference above the softening point, the lesser the fixing time needed and the thicker the luster coat.

For a metal substrate with a vitreous enamel coating, the softening point of the coating is about 600 degrees Fahrenheit to about 1100 degrees Fahrenheit. For a ceramic substrate with a vitreous glaze, the softening point of the coating is about 900 degrees Fahrenheit to about 1800 degrees Fahrenheit. For glass, the softening point is about 400 degrees Fahrenheit to about 1600 degrees Fahrenheit. Any luster pigment fixing temperature for a glass substrate is preferably below its softening point to avoid glass deformation. For an unfused vitreous overglaze, the temperature needed to fuse the overglaze is also sufficient to fix the luster pigment to its surface, i.e. about 1000 degrees Fahrenheit to about 1500 degrees Fahrenheit. The softening point or fusing point of the particular vitreous surface is readily determined using published data or is experimentally determined in a routine fashion.

Once the proper temperature and time have been achieved, the substrate is cooled. The resultant product has a surface coating of the luster pigment fixed to its surface. The pigments are permanently fixed to its surface. The pigments have retained their pleasing appearance, not noticeably affected by the elevated temperatures. Flat glass in particular has a pleasing appearance and the quality of a reflective architectural glass with the reflective properties enhanced when viewed from the side opposite to its application and at its reflective angle.

It is theorized that in the method of this invention, the luster pigments are not chemically attacked by the enamel or glaze components to the extent an appearance change is noticeable simply because of the surface application. Luster pigments embedded in the matrix of any formulation are believed more likely to be subjected to chemical activity. The use of more pigment in an enamel or glaze formulation in effect allows for a "pigment sacrifice", but is expensive and still does not enjoy the same appearance benefits as enjoyed with the present invention.

A one-step method of fusing the glass components of the vitreous surface coating and fixing the luster pigments to the vitreous surface is possible with the vitreous enamels on metal, vitreous enamels on glass, and vitreous overglazes. Thus the vitreous enamel in an unfused state is applied to an underlying substrate as described above either dry or wet. Next, the luster pigment is surface applied. The substrate with its overlying unfused vitreous enamel and luster pigment surface application is now subjected to heat sufficient to fuse the glass components. The needed temperature and time for the fusing step is also sufficient to fix the luster pigment in a manner where the benefits of the invention are enjoyed. The vitreous overglaze is typically applied as a screen print or decal to the substrate as a layer of unfused frit and a layer of luster pigment with the pigment on the surface. Next, the screen print or decal is heated to a temperature and for a time sufficient to fuse the overglaze components and to fix the luster pigment to the overglaze.

It has been found, however, that a one-step method for a vitreous glaze on a ceramic substrate is not feasible because of the very high temperature and long fusing times needed by these materials to induce the chemical reactions needed. Such materials require the two step method of first fusing at the proper temperature and time, and then luster pigment surface application and fixing as discussed above.

The examples which follow illustrate the methods of the invention.

EXAMPLE I

This example illustrates a method of fixing luster pigments to a vitreous enamel on a metal substrate.

A copper substrate test tile initially has an enamel coating applied. The coating is an 80 mesh dry opaque black enamel sold by Thompson Enamel Co. under the code number 3990. The enamel coated substrate is initially heated to 1300 degrees Fahrenheit to fuse the coating. The dilatometric softening point of the enamel is 689 degrees Fahrenheit.

In accord with this invention, a luster pigment coating is applied to the enamel coated copper substrate. The pigment coating is a dispersion of luster pigment based on mica flakes having a titanium dioxide coating. The pigment is supplied by Mearl Corp. as HI-LITE GREEN 9820C. It is dispersed 50:50 by volume in an aqueous gum solution supplied by Thompson Enamel Co. and identified as KLYR-FIRE. The pigment dispersion is applied to the enamelled substrate by brush, dried and then placed in an oven for three minutes at 1060 degrees Fahrenheit, i.e. 371 degrees Fahrenheit above the vitreous surface's softening point. The coated tile is removed after the three minutes, cooled, rinsed in water and tested for durability and appearance.

The luster pigment is fixed to the vitreous surface. It could not be washed off or scrubbed off by aggressive scrubbing with a household cleanser. Additionally, the appearance of the luster pigment coating is equivalent to that of a paint chip supplied by the supplier, thereby indicating it was not adversely affected by the vitreous enamel or heat under the conditions used.

EXAMPLE II

This example illustrates the method of fixing luster pigments to a vitreous glaze on a ceramic substrate.

A ceramic substrate test tile initially has a liquid opaque black vitreous glaze supplied by American Art Clay., Inc. as AMACO LG-1 applied to its surface, dried and fused at 1915 degrees Fahrenheit. The softening point of the glaze is estimated at about 1436 degrees Fahrenheit.

A luster pigment coating is next applied. The pigment is the same as described in Example I. The coated tile is placed in an oven at 1780 degrees Fahrenheit for three minutes, removed, cooled, rinsed and evaluated. This temperature is 344 degrees Fahrenheit above the vitreous glaze's softening point. The luster pigment coating is found to be durable and its appearance excellent as measured by comparison to the printed paint chip supplied by its supplier.

EXAMPLE III

This example illustrates a method of fixing luster pigments to a glass surface wherein the underlying substrate is also glass.

Two glass substrate test tiles are used. One has a vitreous enamel coating applied and fused at 1517 degrees Fahrenheit, while the other one has no enamel coating. The enamel is Thompson Enamel Co.'s code number 5990, an 80 mesh dry powder opaque black enamel. It has a softening point of 1031 degrees Fahrenheit. The softening point of the uncoated glass is 1094 degrees Fahrenheit.

Each of the two test tiles has a luster pigment coating applied. The coating is as described in Exhibit I. Next, the enamel coated test tile is placed in an oven and heated at 1380 degrees Fahrenheit for three minutes. The other glass test tile is placed in an oven and heated at 1460 degrees Fahrenheit for three minutes. These temperatures are 349 degrees Fahrenheit and 366 degrees Fahrenheit above the respective vitreous surface softening point temperatures.

The tiles are removed from the ovens after the three minutes fixing times, cooled, rinsed and evaluated. Both luster pigment coatings are durable and have a good appearance.

EXAMPLE IV

This example illustrates the method of the invention wherein the luster pigments are dusted onto a wet unfused vitreous enamel surface.

An iron substrate test tile with a fused ground coat is first given a spray coating of a liquid opaque black enamel supplied by Ceramic Coating Company. The tile while still wet next has luster pigments applied dry onto the surface of the wet enamel by an electrostatic spray gun. The pigment is HI-LITE GREEN 9820C luster pigment supplied by the Mearl Corp. The tile is now dried by placement under infrared lights to drive off the water in the enamel coating.

The tile is then placed in an oven at 1420 degrees Fahrenheit for three minutes. During this time period, the enamel is fused to the ground coat and the pigment is fixed to the enamel. The tile when removed from the oven, cooled and rinsed is found to have excellent scuffing resistance and an appearance equivalent to the pigment manufacturer's standard paint chip.

EXAMPLE V

This example illustrates the method of the invention wherein luster pigment is dusted onto a hot vitreous enamel surface.

A copper substrate tile has an 80 mesh dry opaque black enamel supplied by Thompson Enamel Co. as code 1995 applied to its surface. The coated tile is placed in an oven at 1460 degrees Fahrenheit to fuse the coating to the copper substrate. The oven temperature is reduced to 1300 degrees Fahrenheit. The tile is removed and has a luster pigment dusted on its surface while still hot. The pigment is Mearl Corp.'s HI-LITE GREEN 9820C. The tile is then placed back into the oven for three minutes at 1300 degrees Fahrenheit, removed, cooled, rinsed and evaluated. A speckled appearance is obtained due to the manner of applying the luster pigment. Additionally, luster quality and durability of the tile are excellent.

EXAMPLE VI

This example illustrates the importance of using the proper temperature differential over the vitreous surface's softening point.

Small high fire, white bisque ceramic test tiles, about ½ inch in diameter, have a vitreous glaze applied. The glaze is a liquid opaque black gloss glaze LG-1 from the American Art Clay Company (AMACO). It is applied by brush to the test tiles. The coated ceramic tiles are dried, heated from room temperature to 1915 degrees Fahrenheit, and allowed to cool in the oven to room temperature to bind the glaze to the ceramic. The softening point of this glaze is estimated at about 1436 degrees Fahrenheit.

A luster pigment coating is next applied to the surface of the vitreous glaze on the ceramic test tiles. The coating is a dispersion of a luster pigment based upon mica flakes having a metal oxide coating. The pigment for this example is HI-LITE GREEN 9820C from the Mearl Corporation. It is dispersed 50:50 by volume in an aqueous gum solution supplied by the Thompson Enamel Company and identified as KLYR-FIRE. The pigment dispersion is applied by brush as a ¼ inch dot to the vitreous surface and then dried before placing in the oven. Firing temperatures and times to fix the luster pigment are varied. Test tiles are cooled, rinsed in water to remove the unfixed pigment, and towel dried before grading for luster quality. The remaining luster pigment is fixed to the vitreous surface. It could not be washed off or scrubbed off.

Samples are graded on a 0 to 4 scale for luster quality at the reflective angle versus the standard color chip for this green luster pigment taken as grade 4. A grade of 0 indicates no luster (i.e. the base glaze), while a grade of 2 is midway between the base glaze and the standard color ship in luster quality. Results are as follows:

| Temperature (degrees Fahrenheit) | Luster Quality Grades (Minutes) | | | Differential over Softening Point (degrees Fahrenheit) |
|---|---|---|---|---|
| | 3 | 6 | 12 | |
| 1460 | 0 | 0 | 1− | 24 |
| 1500 | 0 | 0 | 1− | 64 |

| Temperature (degrees Fahrenheit) | Luster Quality Grades (Minutes) | | | Differential over Softening Point (degrees Fahrenheit) |
|---|---|---|---|---|
| | 3 | 6 | 12 | |
| 1540 | 0 | 0 | 2 | 104 |
| 1580 | 0 | 1 | 2 | 144 |
| 1620 | 1− | 3 | 4 | 184 |
| 1660 | 2 | 4 | 4 | 224 |
| 1700 | 3 | 4 | 4 | 264 |
| 1740 | 3 | 4 | 4 | 304 |
| 1780 | 4 | 4 | 4 | 344 |

The fixing temperature of the luster pigment is taken as the minimum temperature at which the luster quality is equal to the standard at the reflective angle (i.e. grade 4). The differential for the fixing temperature of the luster pigment over the softening point of the vitreous surface differs according to the residence times. At three minutes the differential is 344; at six minutes, 224; and at twelve minutes, 184.

Replacement of HI-LITE GREEN 9820C by other luster pigments from the Mearl Corporation (i.e. INCA GOLD 92226, SUPER SPARKLE) did not change the observed fixing temperature for these tests.

EXAMPLE VII

A method wherein the luster pigments are mixed with a vitreous enamel and applied to a substrate is compared with the method of this invention wherein the luster pigments are surface applied to a substrate having a fused vitreous enamel on its surface.

A vitreous enamel is applied to a copper test tile. The enamel is an 80 mesh transparent enamel sold by Thompson Enamel Co. as CODE 2310. Luster pigment is added at a 10% by volume level to the enamel. The pigment is a stabilized pigment available as PISAM-PEVA GREEN EM-140250, from E. M. Industries. The test tile is heated to 1460 degrees Fahrenheit for three minutes to fuse the pigmented enamel.

The same transparent enamel as above described without pigment addition is also applied to two other copper test tiles. The transparent enamels are applied as-is and then fused at 1460 degrees Fahrenheit. One test tile has the stabilized luster pigment described above applied as part of a vitreous flux at a 10% level. The flux is Thompson Enamels Co.'s PF-1. The other test tile has a surface application of an unstabilized luster pigment supplied by EM Industries, Inc. as AFFLAIR GREEN 235 without added flux.

The two test tiles are then placed in ovens for three minutes at 1300 degrees Fahrenheit. In all cases, the temperatures are at least 180 degrees Fahrenheit above the respective vitreous enamel's softening point.

| Sample | | Luster Grade |
|---|---|---|
| A | Vitreous Enamel With Stabilized Luster Pigment Included | 2− |
| B | Vitreous Enamel With Surface Coat of Stabilized Pigment In Vitreous Flux | 2+ |
| C | Vitreous Enamel With Surface Coat of Unstabilized Pigment | 4 |

The appearance of the test tiles are graded visually for luster quality in the manner described in Example VI. The above results indicate the importance of applying the luster pigments as surface coatings in accord with the invention. Sample C gives a very good reading. In fact, the reading indicates that the more costly stabilized luster pigments do not provide an appreciable appearance benefit sufficient to justify their cost. Those samples wherein the pigments are applied as a part of the enamel or flux to the substrate, i.e. Samples A and B have unacceptable appearances.

While the invention has been described in detail and illustrated in the examples, various modifications can be made to the invention. All modifications and variations of an obvious nature are considered within the scope of the invention as claimed in the appended claims.

I claim:

1. A method of producing a durable lustrous coating on a vitreous surface of a substrate object, comprising the steps of:
   (a) applying a surface coating of a flux-free and frit-free inorganic based luster pigment to a fused vitreous surface of the object; and
   (b) heating the vitreous surface to a temperature and for a time sufficient to fix the luster pigment thereto so as to provide the durable lustrous coating.

2. The method of claim 1 wherein the vitreous surface is a vitreous enamel overlying a metal substrate.

3. The method of claim 1 wherein the vitreous surface is a vitreous glaze overlying a ceramic substrate.

4. The method of claim 1 wherein the vitreous surface is on a glass substrate.

5. The method of claim 4 further wherein the vitreous surface is a vitreous enamel on the glass substrate.

6. The method of claim 1 wherein the vitreous surface is a vitreous overglaze overlying a glass, enameled metal or glazed ceramic substrate.

7. The method of claim 1 wherein the luster pigment is surface applied dry to the vitreous surface.

8. The method of claim 1 wherein the luster pigment is dispersed in a carrier liquid and is then surface applied to the vitreous surface.

9. The method of claim 2 wherein the vitreous enamel has a softening point temperature of from about 600 degrees Fahrenheit to about 1100 degrees Fahrenheit and the vitreous enamel is heated to a temperature at least about 180 degrees Fahrenheit above its softening point.

10. The method of claim 3 wherein the vitreous glaze has a softening point temperature of from about 900 degrees Fahrenheit to about 1800 degrees Fahrenheit and the vitreous glaze is heated to a temperature at least about 180 degrees Fahrenheit above its softening point.

11. The method of claim 4 wherein the glass substrate is heated to a temperature of at least about 200 degrees Fahrenheit below its softening point to avoid glass deformation.

12. The method of claim 1 wherein the luster pigment is inorganic platelet-shaped particles of from about 1 micron to about 180 microns in length, about 1 micron to about 180 microns in width and about 0.1 microns to about 3 microns in thickness with a surface coating of at least one metal oxide layer.

13. The method of claim 12 wherein the luster pigments has a temperature stability to at least about 800 degrees Fahrenheit.

14. The method of claim 13 wherein the inorganic platelet-shaped particles of the luster pigment are mica.

15. The method of claim 14 wherein the luster pigment is mica flakes coated with titanium dioxide, ferric oxide, or a mixture thereof.

16. The method of claim 13 wherein the inorganic platelet-shaped particles of the luster pigment are glass.

17. The method of claim 16 wherein the luster pigment is glass coated with titanium dioxide, ferric oxide, or a mixture thereof.

18. A method of producing a durable lustrous coating on a vitreous surface of a glass object, comprising the steps of:
   (a) applying a surface coating of a flux-free and frit-free inorganic based luster pigment to a fused vitreous surface of the glass object; and
   (b) heating the vitreous surface to a temperature and for a time sufficient to fix the luster pigment thereto so as to provide the durable lustrous coating.

19. The method of claim 18 further wherein the vitreous surface on the glass object is a vitreous enamel and the luster pigment is applied to said vitreous enamel.

20. The method of claim 18 further wherein the glass object has a vitreous overglaze thereon and the luster pigment is applied to said vitreous overglaze.

21. The method of claim 18 wherein the luster pigment is applied dry to the vitreous surface of the glass object.

22. The method of claim 18 wherein the luster pigment is dispersed in a carrier liquid and is then applied to the vitreous surface of the glass object.

23. The method of claim 18 wherein the luster pigment is inorganic platelet-shaped particles of from about 1 micron to about 180 microns in length, about 1 micron to about 180 microns in width and about 0.1 microns to about 3 microns in thickness with a surface coating of at least one metal oxide layer.

24. The method of claim 23 wherein the luster pigment has a temperature stability to at least about 800 degrees Fahrenheit.

25. The method of claim 24 wherein the inorganic platelet-shaped particles of the luster pigment are mica.

26. The method of claim 25 wherein the luster pigment is mica flakes coated with titanium dioxide, ferric oxide, or a mixture thereof.

27. The method of claim 26 wherein the luster pigment is mica flakes coated with ferric oxide.

28. The method of claim 24 wherein the inorganic platelet-shaped particles of the luster pigment are glass.

29. The method of claim 28 wherein the luster pigment is glass coated with titanium dioxide, ferric oxide, or a mixture thereof.

30. The method of claim 18 wherein the vitreous surface of the glass object is heated to a temperature of at least about 200 degrees Fahrenheit below the softening point of the glass so as to prevent glass deformation.

31. The method of claim 18 wherein the inorganic based luster pigment is applied to the vitreous surface of the glass object at a level of about one gram per square foot of surface.

32. A method of producing a durable lustrous coating on a vitreous surface of a ceramic object, comprising the steps of:
   (a) applying a surface coating of a flux-free and frit-free inorganic based luster pigment to a fused vitreous glaze surface overlying the ceramic object; and
   (b) heating the vitreous glaze surface to a temperature at least about 180 degrees Fahrenheit above its softening point and for a time sufficient to fix the luster pigment thereto and to provide the durable lustrous coating.

33. The method of claim 32 further wherein the vitreous glaze surface of the ceramic object further has a vitreous overglaze thereon.

34. The method of claim 32 wherein the luster pigment is inorganic platelet-shaped particles of from about 1 micron to about 180 microns in length, about 1 micron to about 180 microns in width and about 0.1 microns to about 3 microns in thickness with a surface coating of at least one metal oxide layer.

35. The method of claim 34 wherein the luster pigment is mica flakes coated with titanium dioxide, ferric oxide, or a mixture thereof.

36. The method of claim 34 wherein the luster pigment is glass coated with titanium dioxide, ferric oxide, or a mixture thereof.

37. The method of claim 32 wherein the surface is heated to a temperature of about 260 degrees Fahrenheit to about 380 degrees Fahrenheit above the softening point of the vitreous glaze surface.

* * * * *